Dec. 24, 1968   J. P. ERICSON   3,418,026
BALL BEARING ROLLER ARRANGEMENT FOR FILE CABINET DRAWERS
Filed Nov. 1, 1965   2 Sheets-Sheet 1
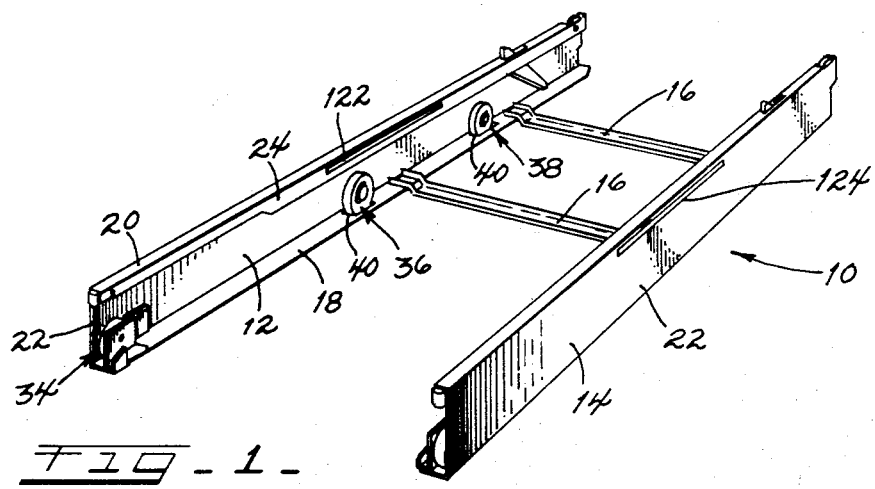
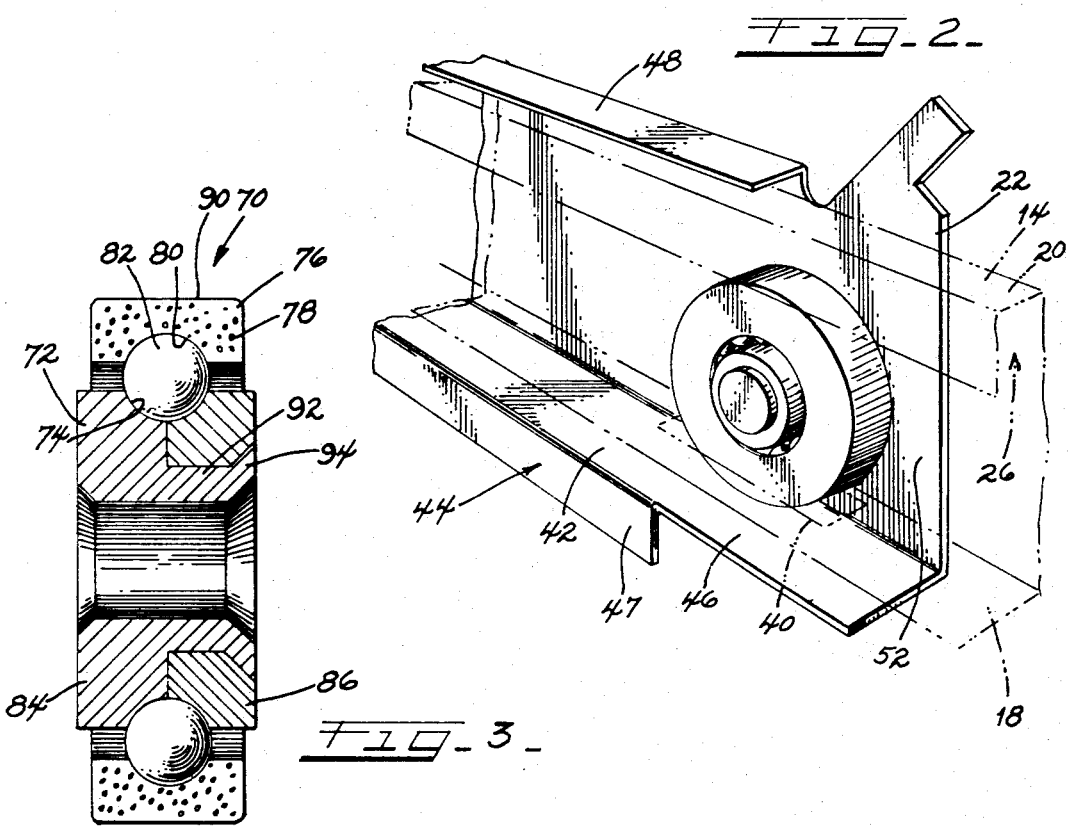
INVENTOR
JOHN P. ERICSON
BY
ATT'YS

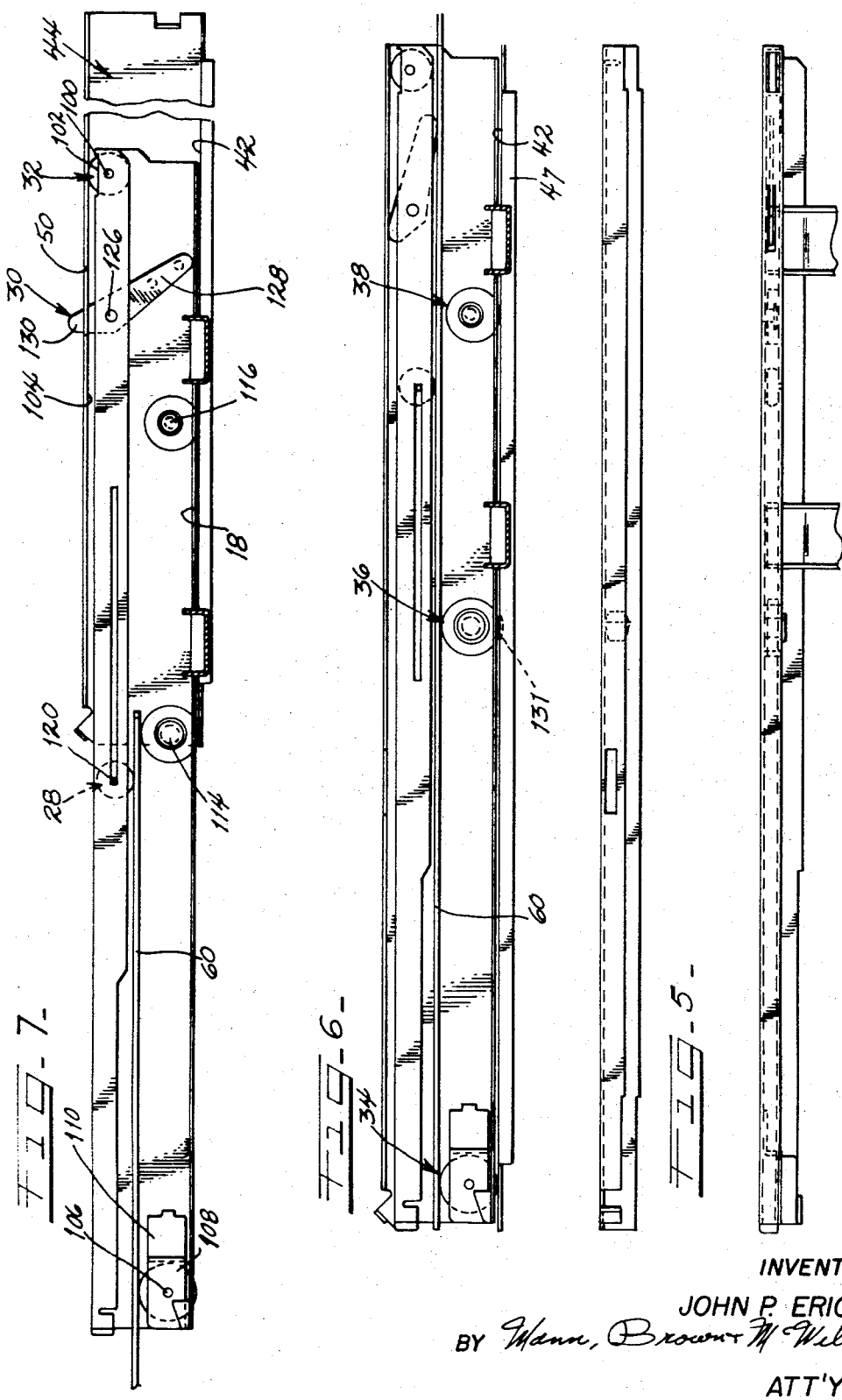

United States Patent Office 3,418,026
Patented Dec. 24, 1968

3,418,026
BALL BEARING ROLLER ARRANGEMENT
FOR FILE CABINET DRAWERS
John Philip Ericson, St. Charles, Ill., assignor to
All-Steel Equipment Inc., a corporation of Illinois
Filed Nov. 1, 1965, Ser. No. 505,870
1 Claim. (Cl. 308—6)

ABSTRACT OF THE DISCLOSURE

The ball bearing roller arrangement of the invention is especially adapted for file drawer suspensions and is in the form of a ball bearing unit in which the outer race is an annular or ring shaped sintered member having a porosity in the range of 5.5 to 5.9 gram per cubic centimeter, and which is lubricant impregnated to a minimum of 24 percent by volume. The sintered member defines a cylindrical periphery that rides on the trackway formed by the cabinet case slide, and is machined about its inner surface to define the bearing ball raceway forming groove. The sintered member is formed from a special composition of iron, copper and carbon that provides adequate strength for long wearing characteristics as the file cabinet drawer suspension roller while being soft enough to permit machining of the bearing ball outer raceway, and is assembled within inner race and bearing balls to provide a ball bearing unit adapted for incorporation in a file drawer suspension. The special porosity, lubricant content, and strength characteristics of the roller provide a ball bearing roller arrangement especially adapted for file drawer suspensions that avoids a long standing problem in this field having to do with the galling of the case slide under the rolling action involved, which permits such equipment to stand up to 500,000 cycles of operation, as distinguished from about 15,000 cycles obtainable using conventional solid steel rollers.

My invention relates to a ball bearing roller arrangement for progressive suspensions for file cabinet drawers, and more particularly, to a ball bearing type sintered roller for file cabinet drawer progressive suspensions that eliminates the problem of trackway galling and early failure of the drawer slide arrangement.

File drawer cabinets of the progressive suspension type employ a cradle mounted on rollers on either side thereof that ride in channel-shaped members forming a part of the filing cabinet frame that define trackways for the rollers. As the trackway defining members, known to the industry as case slides, must be formed into shape through normal stamping and bending operations, they are usually formed from a relatively soft low-carbon steel such as commercial steel No. 1010.

Progressive suspensions involve special weight handling problems in that the progressive action of the cradle and drawer with relaiton to the case slides is caused by the pinching action of what are known as the floating roller and the propelling roller of the system. This involves an upper rear roller bearing against and rolling along the upper trackway of the case slide and a lower front roller supporting the drawer and rolling along the trackway defined by the under surface of the drawer rail, as well as the action of the propelling roller rolling along its case slide trackway and the action of the propelling and pinching rollers rolling along the trackways defined by the upper and lower (or under) surfaces of the drawer rail.

General government specifications for file drawers of this type as to standards of performance have called for the file drawer to withstand 50,000 cycles of operation carrying an 84-pound load without requiring more than a 3¾ pound pull on the drawer to draw it out of its cabinet.

Prior efforts in connection with progressive suspension slide-type drawers using solid steel rollers under these conditions would provide only about 15,000 cycles before failure because of excessive drawer pull-out.

Tests and studies as to the cause of these failures have revealed that a galling of the roller trackway and drawer rail surfaces that are engaged by the rollers occurs which results in the metal of the trackway and rails flaking off in small particles to the point where the trackway and rails deform, causing a binding of the suspension and ultimate failure. More specifically, tests and studies have shown that extreme wear leading to failure has taken place in the case slide trackway surfaces engaged by the upper rear and propelling rollers, respectively, and also in the drawer rail surfaces engaged by the pinching and propelling rollers, respectively.

Prior to my invention much effort has been expended over a period of ten to fifteen years to meet the indicated government specifications by using various approaches to the problem, but all without success.

These efforts initially involved changing the type of steel employed to make the slide, increasing its gauge, and changing the flanging that forms the trackway to improve its strength, but none of these approaches materially alleviated the problem. Even the use of frequent lubrication to reduce the rolling friction between the roller and its trackway did not materially improve the situation as the high unit pressures of the rollers dissipated the oil rapidly, thus indicating that this type of lubrication alone was not the answer to the problem. Furthermore, the use of oil in ample amounts resulted in an overly dirty suspension that readily soiled the clothes of the user.

Other approaches used to solve the problem have been to employ rollers made from nylon and Delrin, and while rollers of this type reduced the galling problem, they introduced new problems. Nylon was found to slip too readily on the trackway even without any lubrication whatsoever, and in addition was not strong enough to carry the load. Delrin proved to be sufficiently strong, but as this material has a lower coefficient of friction than nylon, the sliding action of the roller was increased.

The principal object of my invention is to provide a ball bearing roller arrangement for file cabinet drawer progressive suspensions that completely elimiates the galling problem while at the same time providing a roller structure of sufficient lubrication, strength and wear resistance to insure that a greatly extended useful life will be obtained.

Other objects of the invention are to provide a roller arrangement that is readily adapted to existing makes of progressive suspension arrangements, to provide a progressive suspension ball bearing arrangement that is self-lubricating, and to provide a progressive suspension ball bearing roller arrangement that is economical of manufacture, convenient to install, and readily adapted to a wide variety of uses.

Other objects, uses and advantages will be obvious or become apparent from a consideration of the following detailed description and the application drawings.

In the drawings:

FIG. 1 is a diagrammatic perspective view illustrating a file drawer progressive suspension cradle of the type to which my invention relates;

FIG. 2 is a fragmental perspective view illustrating an end portion of the file drawer case slide in which the suspension rollers operate, showing the suspension cradle in phantom;

FIG. 3 is a diagrammatic cross-sectional view illustrating a progressive suspension cradle roller arranged in accordance with my invention;

FIG. 4 is a plan view of the far side of the cradle shown in FIGURE 1;

FIG. 5 is a plan view of the case slide in which the cradle portion shown in FIG. 4 operates;

FIG. 6 is a side elevational view showing the suspension received within the case slide and illustrating the parts in the retracted position of the drawer; and FIG. 7 is a view similar to that of FIG. 6 but illustrating the suspension in the extended position of the drawer.

However, it is to be understood that the specific drawing illustrations provided are supplied primarily to comply with requirements of 35 USC 112, and that the invention may have other embodiments.

Reference numeral 10 of FIGURE 1 generally indicates a cradle-type file drawer suspension of the type to which the invention relates, which comprises a pair of cradle side arms 12 and 14 that are rigidly secured together by a pair of cross ties 16 in such a manner that the members 12 and 14 extend parallel to each other.

As indicated in FIGURE 1, the members 12 and 14 are generally channel-shaped in configuration with each including a lower flange 18 and an upper flange 20 joined together by a web 22.

The upper flange 20 has its end portion 24 turned toward the lower flange 18 to define a recess 26 (see FIGURE 2) in which are journaled several of the operating elements of the suspension, namely the floating pinch roller 28 (see FIGURE 7), latch arm 30 (known to the art as an "out-stop"), and the upper rear roller 32.

The cradle side arms also have journaled on them adjacent the lower flange 18 the lower front roller 34, the propelling roller 36, and the lower rear roller 38, which are positioned to protrude through slots 40 formed in the lower flange 18 so that their peripheries will ride on the respective trackways 42 that are defined by the case slides 44.

The case slides 44 are suitably and fixedly mounted in the usual file drawer frame in such a manner that they extend parallel to each other and are disposed in a substantially horizontal plane. As indicated in FIGURES 2, 5 and 7, the case slides 44 are also generally channel-shaped in configuration and comprise a lower flange 46 that defines the trackway 42, and upper flange 48 formed with a slot 50 adapted to cooperate with the latch arm or out-stop 30 in the manner shown in FIGURE 7, and a connecting web portion 52. Lower flange 46 has a turned down skirt portion 47 for strengthening purposes.

The suspension cradle and case slide illustrated in the drawings are per se well known to the art, and as those familiar with this field will immediately recognize, the cradle side arms 12 and 14 are inserted in the respective case slides 44 to ready the suspension for use. Each file drawer is provided on either side thereof with a laterally extending flange 60 (see FIGURES 6 and 7) that forms a rail which is inserted between the upper and lower rollers of the respective cradle side arms in a manner suggested by FIGURES 6 and 7, all in a manner known to the art.

As discussed hereinbefore, prior to my invention it has been found extremely difficult with conventional progressive suspensions to meet the 50,000 cycle standard of performance specified by Federal Government specifications. It has been found that when using conventional solid steel rollers for rollers 34, 36 and 32, the trackway 42 after a relatively few number of cycles of operation begins to flake away under the rolling action of the rollers when the drawer suspension is extended and retracted, and the ultimate result is that the suspension will ultimately fail after as few as 15,000 cycles.

My work in this field has shown that strengthening of the case slide, as by employing a stronger material with a thicker gauge, did not materially alleviate the problem and neither did ample lubrication, as already indicated. Furthermore, it was found that using materials such as nylon and Delrin that would conform to the shape of the runway added further problems, the principal one being that even without lubrication the coefficient of rolling friction between rollers of these materials and the trackway was too low to insure an absence of any sliding action of the rollers.

In accordance with my invention, I provide the roller construction shown in FIGURE 3, and progressive suspensions equipped with this roller construction have been found to not only meet the desired 50,000-cycle specification, but they will also result in a performance life on the order of 500,000 cycles.

The special roller construction is indicated by reference numeral 70 in FIGURE 3 and comprises an inner race structure 72 formed with an inner bearing raceway 74, an annular outer race 76 that forms the rolling element 78 on the roller, with the outer race 76 being formed with an outer bearing raceway 80, and a plurality of bearing balls 82 received in the raceways 74 and 80.

In the arrangement shown in FIGURE 3 the inner race 72 is a two-part sub-assembly comprising annular elements 84 and 86 assembled as shown to form the inner race structure 72. Element 84 defines a bore 85 that permits the assembled roller to be mounted on a suitable pin or bolt structure.

In accordance with this invention, the outer race 76 is formed from a sintered material having the following composition (by weight):

| | Percent |
|---|---|
| Iron _____minimum__ | 92 |
| Copper _____ | 4–6 |
| Carbon _____ | .15–.40 |
| Total other elements _____maximum__ | 2 |

The material from which the outer race 76 is formed is to have a density lying in the range of from about 5.5 to 5.9 grams per cubic centimeter and is to have a hardness Rockwell B10 to B40. The sintered material is to be impregnated with a good grade of oil to a minimum of 24% by volume. The material should have a ASTM K value strength on the order of 40,000 minimum (check on straight sleeve).

The outer race 76 is thus an oil-impregnated sintered element which provides lubrication for both the trackway 42 and the bearing balls 82. Furthermore, even though lubrication is provided to the roller, the granular material from which the outer race is formed along the periphery or rolling surface 90 on the roller tends to bite into the trackway 42 and insure the traction necessary to avoid any slipping between the roller and the trackway. It is thus preferably that that surface 90 take its final shape in the forming die, and machining of surface 90 should be avoided.

In accordance with my invention, rollers of the type shown in FIGURE 3 are employed as rollers 32, 34, 36 and 38 with the amazing result that endurance test results on the order of 500,000 cycles may be obtained.

*Specific description*

The iron used as part of the above-specified composition may be any suitable low-grade iron type which is formed into a sintered product including the other indicated material following any usual and customary procedure. The sintered product should be impregnated with a good grade of lubricant oil and it is this oil which is what is relied on to provide lubrication for the trackway and bearing balls during the useful life of the suspension cradle. The oil impregnation may be performed in any conventional manner, such as by a suitable vacuum impregnation process.

After the sintered race 76 is formed, it is machined or press formed in any suitable manner to form raceway 80 to approximately the shape shown in FIGURE 3, after which it is assembled with the remainder of the roller structure indicated.

In assembling the roller structure, the outer race 76 is placed about the inner race element 84 and the bearing balls applied to the raceways 74 and 80 through the space that is left by the missing element 76; after the desired number of bearing balls 82 are received within the raceways, the number 86 is inserted over the annular portion 92 of element 84, the end portion 94 of which is then swaged outwardly as indicated to hold these elements in assembled relation. Suitable ball-spacing devices or the like may be applied to the bearing balls as may be necessary or desirable depending upon the particular roller construction desired.

In applying the rollers 32, 34, 36 and 38 to the cradle 10, it will be observed that the roller 32 is journaled on a suitable pin 100 extending between the turn-down flange portion 24 and the web 22 of the cradle side arm at the rear end of the cradle. The roller 32 projects upwardly through an opening 102 formed in the flange 20 for engagement with the trackway 104 that is defined by the under surface of case slide flange 48.

At the forward end of the cradle 10, the roller 34 is journaled on a pin 106 journaled between a bracket 110 and web 22 of the side arms. The bracket 110 is affixed in place to the web 22 as by spot welding or the like.

The rollers 36 and 38 are journaled on suitable cantilever-type pins 114 and 116 respectively and are made fast to the web 22 in any suitable manner. The rollers 34, 36 and 38 extend through openings 40 of the cradle side arm flanges 18 to engage the respective trackways 42.

The pinch rollers 28 are received within the recess 26 and are positioned transversely of the respective side arms 12 and 14 to substantially complement the recess 26 laterally thereof. The respective rollers 28 in the specific suspension illustrated are formed from the sintered oil impregnated material above described except that they are completely made up of this material (and are thus "solid" rollers) and each is provided with a shaft 120 that projects outwardly of the recess 26 on either side thereof and rides in the elongated openings 122 and 124 that are formed in the web 22 and flange portion 24, respectively. Rollers 28 are positioned to ride on the under surface of the cradle flange 20 when the cradle supports a file drawer.

The out-stop 30 is positioned within the recess 26 and is journaled on pin 126 extending between the web 22 and the flange portion 24 of respective side arms 12 and 14. As indicated in FIGURES 6 and 7, the end 128 of arm 30 is proportioned so that when the cradle is moved to the extended position shown in FIGURE 7, the end 130 of the arm 30 will enter slot 50 and be disposed in the upright position shown in FIGURE 7 with the end 128 being disposed in bracing relation with the flange 18 of the cradle.

The drawer, the suspension and the file cabinet frame itself may be provided with appropriate latching devices and the like to insure that the drawer will not completely withdraw from the cradle 10 unless such withdrawal is desired.

The trackways 42 of the slides 44 are indented as at 131 to provide a seat for the propelling rollers 36 in the retracted position of the drawer and its suspension. This indentation is called a rebound recess in the art and it is intended to stop rebound of the drawer outwardly of its cabinet on being closed. This seat is considered essential to file cabinet arrangements of the type under consideration and its presence is what has caused much difficulty with rollers of previously known constructions as they have tended to slip and skid with respect to the trackway on the file drawer being drawn outwardly, which as previously indicated, causes flat surfaces to wear on the roller periphery and this hastens failure of the suspension.

Rollers having the construction indicated in FIGURE 3, and more particularly, the sintered outer race arrangement of the type described herein, have been found to have no tendency to slip in the area of the indentation 131 (assuming the propelling roller is now under consideration), and it has been found that a continuous rolling action is obtained, even in the area of the indentations 131.

It therefore will be seen that I have provided a striking improvement in the progressive suspension art by the provision of a ball bearing roller arrangement for progressive suspensions which includes a sintered outer race of the special composition and characteristics described above. Rollers of this type insure long useful life in practice and under the endurance tests, of the type indicated, 500,000 cycle results are possible.

The foregoing description in the drawings are given merely to explain and illustrate my invention, and the invention is not to be limited thereto, except insofar as the appended claims are so limited, since those skilled in the art who have my disclosure before them will be able to make modifications and variations therein without departing from the scope of the invention.

I claim:

1. For use with a trackway of relatively soft, low carbon steel, a ball bearing roller adapted to ride on said trackway while carrying heavy loads and without galling the trackway, said ball bearing roller having inner and outer cylindrical races with a plurality of bearing balls peripherally spaced and maintained between the two races, said outer race being a sintered member having a composition of at least 92% iron, copper in the range of 4% to 6%, and carbon in the range of .15% to .40%, said member being impregnated with a lubricating oil to a minimum of 24% by volume, said sintered member having a density in the range of 5.5 grams to 5.9 grams per cubic centimeter, a hardness in the range of Rockwell B10–B40, and an ASTM K value of at least 40,000, and said outer race having an interior raceway groove therein.

References Cited

UNITED STATES PATENTS

| | | | |
|---|---|---|---|
| 2,153,397 | 4/1939 | Sandler | 308—240 |
| 2,561,163 | 7/1951 | Wolters | 308—3.8 |
| 2,786,726 | 3/1957 | Tarr | 308—240 |
| 2,799,541 | 7/1957 | Wolters | 308—3.8 |
| 3,097,897 | 7/1963 | Taylor | 29—148.4 |

MARTIN P. SCHWADRON, *Primary Examiner.*

L. L. JOHNSON, *Assistant Examiner.*

U.S. Cl. X.R.

308—202, 240